UNITED STATES PATENT OFFICE.

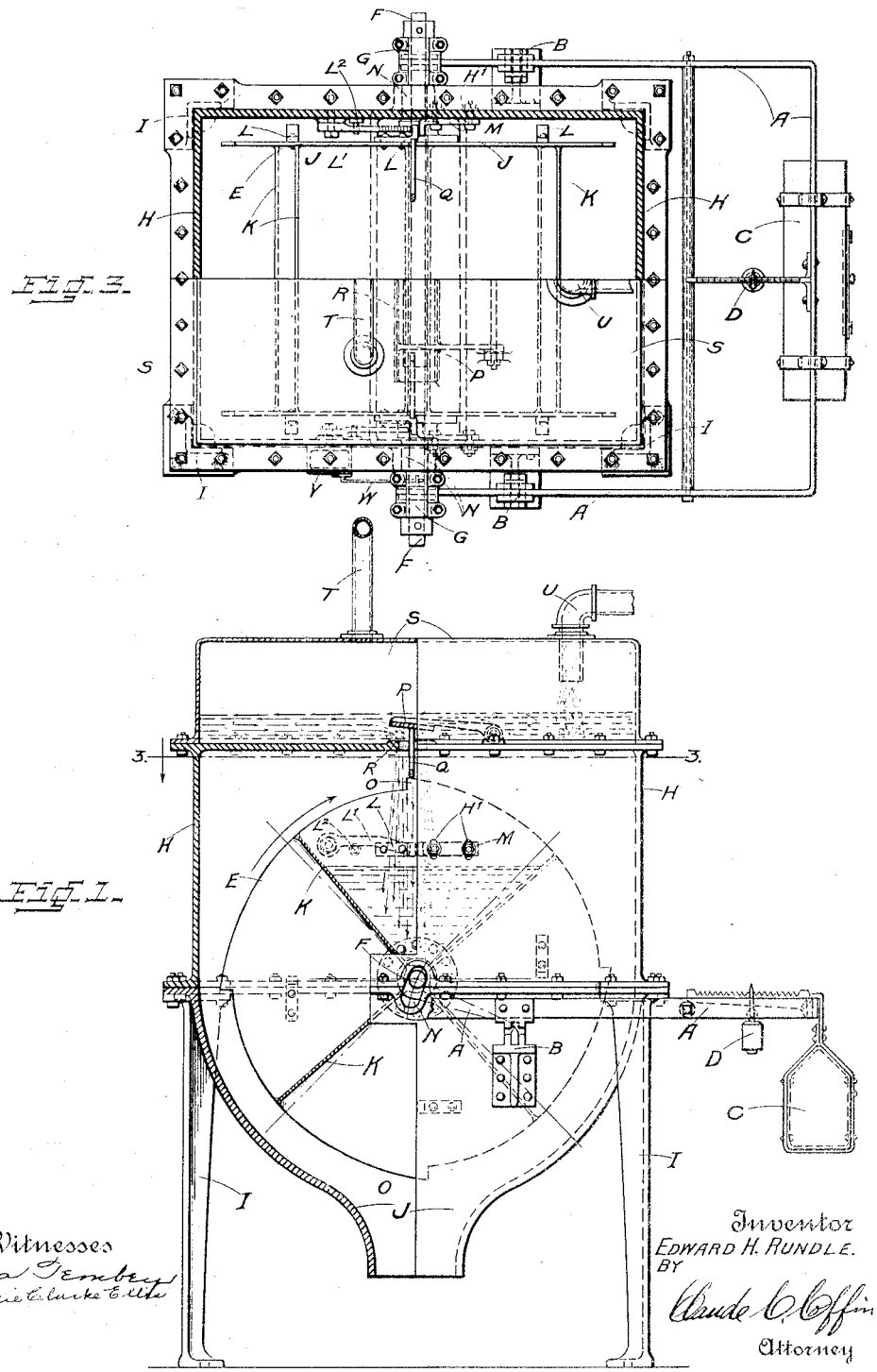

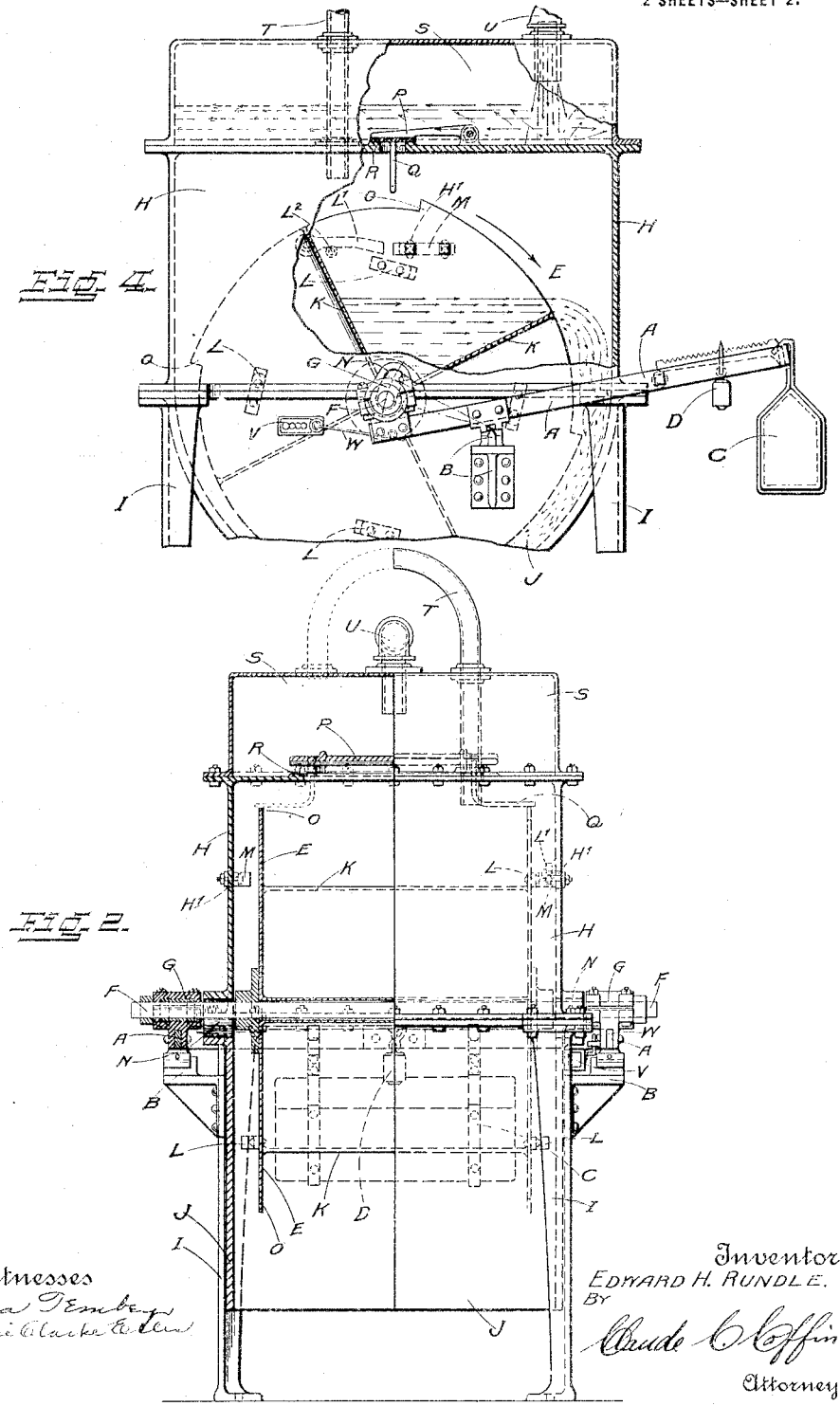

EDWARD H. RUNDLE, OF LONGMONT, COLORADO, ASSIGNOR OF ONE-SIXTH TO ALBERT M. GREGG, OF LONGMONT, COLORADO, AND ONE-SIXTH TO CLAUDE C. COFFIN, OF FORT COLLINS, COLORADO.

AUTOMATIC WEIGHING DEVICE.

1,193,193.  Specification of Letters Patent.  Patented Aug. 1, 1916.

Application filed June 8, 1912. Serial No. 702,506.

*To all whom it may concern:*

Be it known that I, EDWARD H. RUNDLE, a citizen of the United States, residing at Longmont, in the county of Boulder and State of Colorado, have invented new and useful Improvements in Automatic Weighing Devices, of which the following is a specification.

My invention relates to improvements in automatic weighing devices for use especially in the weighing of liquids carrying foam, slime, sediment, etc.

It is designed especially to meet the requirements of weighing liquids on a large scale, and is especially adapted to weighing Steffen waste water in the manufacture of sugar.

The object of my improvement is to provide a durable and automatic weighing scale, of simple and cheap construction, adapted to weigh liquids in as near as possible a continuous flow, without the use of a multiplicity of valves, and wherein the presence of foam, slime, or sediment will not affect the operation. I obtain these objects by the construction illustrated in the accompanying drawings.

In general the device consists of a weighing scales having for a hopper an open, cylindrical, compartment-wheel adapted to receive the material to be weighed, so arranged that the material is automatically dumped from the scales in predetermined quantities by the intermittent rotation of the wheel.

In the drawings the same letters of reference indicate corresponding parts in the different views.

Figure 1 is a side view of the apparatus, the right half and center of the figure being a side elevation and the left hand portion being a vertical center section. Fig. 2 is an end view looking from the left end in Fig. 1, the right half being an end elevation and the left half a vertical center section. Fig. 3 is a top plan with the upper half a horizontal cross-section above the wheel E. Fig. 4 is a side view with a portion of the casing cut away and the exposed interior shown in vertical center section when the scale hopper is being dumped.

A is a forked or U-shaped scale beam adapted to rest and pivot upon fulcrums B riveted to the frame of the machine.

C and D are poises or counter-weights of the scales, C being the weighing weight and D an adjustable correction weight.

E is an open cylindrical compartment wheel divided into compartments by radial partitions K. The wheel is mounted on the scale beam by shaft F of the wheel journaled in ends of the forked or U-shaped scale beam in bearings G.

H is the containing case or casing of the apparatus and constitutes the frame, having an outlet at its base J, and is supported in any suitable manner as by legs I.

K are radial partitions in the cylindrical wheel dividing the wheel into any suitable number of compartments.

L are lugs riveted to the side of the wheel, one lug at the end of each compartment. M is a corresponding lug attached to the frame of the machine; this lug is preferably made adjustable vertically, as by bolts H' through elongated holes in the frame.

N are holes in each side of the casing through which the ends of the shaft F extend, the forks or arms of the scale beam extending around at the outside of the casing or frame. Holes N are vertical slots to allow vertical movement of the wheel shaft as the scale beam rocks upon its pivots or fulcrums.

The periphery or rim of both heads of the cylindrical wheel is cammed at O making relatively short cam risers to control the feeding of material to the wheel. The cams O are made on the rims of the wheel one on each rim for each compartment of the wheel and each lug L.

P is any suitable valve in the floor of a closed tank S on top of and preferably a part of the scale casing. As shown the valve P is a flap valve adapted to close upon valve seat R. Attached to the bottom of valve P and adapted to extend through the hole in valve seat R are bent rods Q extending downward and outward and adapted to ride upon the cams O on the rims of the wheel.

S is a closed tank or reservoir supported by the casing or frame of the machine and may be made as a part of the casing. Tank S is adapted to receive the material to be weighed through a pipe or other suitable conveyer U.

T is a pipe shown as an inverted U-pipe or siphon with its short end opening into the top of closed tank S and its long end extending down through the tank and opening above the uppermost compartment of the compartment-wheel. This inverted U-pipe is provided to carry any foam on the liquid being weighed over into the weighing wheel. Such foam is present in large quantities in Steffen waste water in the manufacture of sugar, and cannot be properly cared for by the valve drawing liquid from the bottom of tank S.

V is any suitable tally register or counter attached to the outside of the casing or frame having an operating arm W extending out under one prong or arm of the scale beam and adapted to be operated by the rise and fall of the beam. V may be merely a counter or it may be calibrated in pounds, or in gallons, cubic feet or any unit of weight for the particular machine or measure for any particular material to be measured.

In operation the poise or counterweight C is removed and the scales balanced empty with weight D, then weight C of predetermined weight is hung upon the weight end of the scale beam. Wheel E is then, when empty, held in its upper-most position with the shaft F resting against the upper end of slot N in the casing or against any other suitable bumper. In this position one lug L on the wheel is engaged with lug M on the frame holding one compartment of the wheel under the valve P and pipe T of the tank or reservoir S as shown in Fig. 1. Rods Q of the valve rest near the upper ends of a pair of cams O holding valve P in an open position. The liquid entering tank S through pipe U, or in any manner, passes through the valve hole in the floor of the tank into the upper-most compartment of the wheel E as indicated in Fig. 1. When this compartment becomes filled to the predetermined amount sufficient to overcome the weight of counter weight C the wheel is carried downward closing the valve P gradually and finally disengaging the lug L from lug M allowing the wheel to rotate in the direction of the arrow or clock-wise as shown in Fig. 1. The lugs L and cams O are placed in an off-center position sufficient to insure the rotation of the wheel in the one direction. As the wheel is carried downward and before the lugs are disengaged the valve P is gradually partially closed cutting down the feeding stream before the wheel starts to rotate, and at the instant the rotation starts rods Q drop off the ends of cams O allowing the valve to completely close and remain closed until the next cam turns under the valve after the next partition has passed the valve. The partial closing of the feed valve gradually as the scale beam starts to rock when the compartment becomes nearly loaded is very important in order to eliminate the error that would otherwise be present due to the velocity of approach of the feeding stream. As the wheel rotates the liquid is dumped from the filled compartment of the wheel into the casing and allowed to pass out through outlet J as indicated in Fig. 4. As soon as the compartment starts dumping the wheel is immediately raised, and after the next partition K has passed under the valve of the storage tank the valve rods Q ride up on the next pair of cams O opening the valve P. The next lug L engages with lug M stopping the wheel with the next compartment under the valve and the cycle of operation is automatically repeated. The downward movement of the wheel end of the scale beam operates the counter V and the filling of the compartment is registered.

If necessary to prevent rebound of the wheel when the lugs engage, a dog L' is provided on the frame to engage on the back side of a lug L. This dog may be of any suitable or desired construction or arrangement; it may be as shown, a pivoted dog resting on a stop pin $L^2$ and adapted to drop behind a lug L as that lug engages with lug M. By this device the use of valves on the scale hopper is obviated and the inaccuracy and trouble caused by the use of valves is eliminated. The valve in the storage tank may be of any suitable construction to be operated by the vertical movement of rods Q to meet the requirements of different materials to be weighed. By modifying the construction of the feeding valve the device may be used for the weighing of solids as well as liquids. It can well be adapted to handle sugar.

In its use in the manufacture of sugar the device is especially adapted to the weighing of Steffen waste water because foam carried with the waste water is discharged and does not affect the operation. The pipe T is provided to carry any foam that may gather at the top of tank S over into the compartment of the wheel being filled. The foam constantly rising out of the liquid gathers at the top of tank S and finds its way through the pipe T into the compartment of wheel being filled.

The device will also handle the weighing of molasses on account of the compartments turning completely over and the long interval given for each compartment to drain. In handling molasses or other sticky or gummy material which may accumulate on the wheel the apparatus is adjusted by removing the counter weight C and balancing the wheel with adjustable weight D.

I claim:

1. In a weighing device the combination of a weighing scales having a rotary hopper carried by the beam of said scales, feeding means to feed material to said hopper, with cams arranged on said hopper to open said feeding means by the rotation of said hopper when said hopper is lifted by said scale beam and allow said feeding means to close gradually with the downward movement of said hopper, substantially as described.

2. In a weighing device a scales having a scale beam, a rotary hopper mounted on said beam, cams on the periphery of said hopper, a valve arranged above said hopper for admitting liquid to said hopper from a suitable supply, valve rods attached to said valve and extending downward and adapted to ride upon said cams and open said valve when said hopper rotates and is lifted by said scale beam and allow said valve to gradually close as said hopper moves downward with the rocking of the scale beam, substantially as described.

3. In a weighing device a weighing scales having a rotary hopper carried by the beam of said scales, means to stop rotation of said hopper when it is lifted by the scale beam and allow rotation of said hopper when the hopper is moved downward, a valve arranged above said hopper for controlling the feed of material thereto, valve rods attached to said valve and extending downward therefrom, cams on the rim of said hopper arranged to engage said valve rods and open said valve by the rotation of said hopper and hold said valve open when the rotation of said hopper is stopped until allowed to nearly close by the downward movement of said hopper, substantially as described.

4. The combination in a weighing device of a weighing scales having a rotary compartment-wheel hopper carried by the beam of said scales and inside a casing, lugs on one head of said wheel, a lug on said casing adapted to engage with a lug on said wheel and prevent rotation of the wheel when the same is lifted and adapted to disengage from the lug on the wheel and allow the wheel to rotate when the same is moved downward, cams on said wheel corresponding with each compartment of said wheel and with each lug on the head of said wheel, a tank above said wheel having a valve above the upper-most compartment of said wheel when the lug on said casing is engaged with a lug on said wheel, valve rods attached to said valve and adapted to extend downward and ride upon said cams when the wheel is rotated and to rest near the ends of a pair of said cams and hold said valve open when said lugs are engaged and to drop off said cams and allow said valve to close when said lugs disengage and said wheel starts rotating, substantially as described.

5. In a weighing device the combination of a weighing scales having a scale beam, a rotary compartment-wheel hopper mounted on said scale beam and supported in a casing, lugs on one head of said wheel, a lug on the casing adapted to engage with the lugs upon the wheel when the wheel is lifted, said wheel having cams on the periphery of its heads, a tank supported above said casing having a valve in its floor, valve rods attached to the under side of said valve and adapted to extend through the valve hole in the floor of the tank and ride upon said cams, substantially as described.

6. The combination in a weighing device of a rotary compartment wheel supported inside a casing, said casing having an outlet at its base and holes in its sides through which the ends of the wheel shaft extend, a forked scale beam pivoted over fulcrums at the sides of the casing, the ends of said shaft being journaled in and supported by the forked ends of said scale beam, a poise adapted to rest upon the other end of said beam, the said wheel having lugs attached to one head, a lug on the casing adapted to engage with the lugs upon the wheel when the wheel is raised and to disengage when the wheel is lowered, cams on the periphery of the heads of said wheel, a tank supported above said wheel, a valve in the floor of said tank, valve rods attached to said valve and adapted to extend down and ride upon said cams, all substantially as described.

7. In a liquid weighing device the combination of a weighing scales having a hopper to receive liquids, a tank supported above said hopper, with a pipe leading from the top of said tank and opening below said tank and above said hopper, substantially as described.

8. The combination of a weighing scales having a rotary compartment-wheel hopper, a tank supported above said wheel, a valve in said tank having valve rods attached to said valve and adapted to be operated through said valve rods engaging upon said wheel, a pipe leading from the top of said tank and opening above said wheel and below said tank, substantially as described.

EDWARD H. RUNDLE.

Witnesses:
W. H. DICKENS,
A. SCOTT HERSHEY.